United States Patent [19]

Kuroda et al.

[11] Patent Number: 5,679,397
[45] Date of Patent: Oct. 21, 1997

[54] TASTE ENHANCER

[75] Inventors: Motonaka Kuroda; Tsutomu Harada; Keigo Shima; Norihiko Yamada, all of Kawasaki, Japan

[73] Assignee: Ajinomoto Co., Ltd., Tokyo, Japan

[21] Appl. No.: 407,368

[22] Filed: Mar. 20, 1995

[30] Foreign Application Priority Data

Mar. 18, 1994 [JP] Japan .................................. 6-048823
Jul. 19, 1994 [JP] Japan .................................. 6-166492
Sep. 6, 1994 [JP] Japan .................................. 6-212280

[51] Int. Cl.$^6$ .................................................. A23L 1/221
[52] U.S. Cl. .......................... 426/650; 426/533; 426/534; 426/655; 426/656
[58] Field of Search .......................... 426/650, 533, 426/534, 656, 655

[56] References Cited

U.S. PATENT DOCUMENTS 4,806,376  2/1989  Saeki .

OTHER PUBLICATIONS

Rombauer et al., The Joy of Cooking, 1975, pp. 560–561, The Bobbs–Merrill Company, Inc., New York.

Ojima, Takao & Nishita, Kiyoyoshi, "Troponin from Akazara Scallop Striated Adductor Muscles", The Journal of Biological Chemistry, vol. 261, No. 35, Dec. 15, 1986, pp. 16749–16754.

Johnson et al, Science, vol. 130, Jul. 17, 1959, 160–161.

*Primary Examiner*—Leslie Wong
*Attorney, Agent, or Firm*—Oblon, Spivak, McClelland, Maier & Neustadt, P.C.

[57] ABSTRACT

A mixture selected from the group consisting of (1) gelatin and tropomyosin and/or tropomyosin peptides, (2) gelatin and paramyosin, and (3) troponin and tropomyosin and/or tropomyosin peptides, which when combined with a low-molecular weight fraction of natural extracts, and heated in water, imparts "KOKUMI" taste characteristics to food and drink.

23 Claims, 1 Drawing Sheet

Ser-Leu-Glu-Ala-Gln-Ala-Asp-Lys-Tyr-Ser-Thr-Lys-Glu-Asp-Lys-
Tyr-Glu-Glu-Glu-Ile-Lys-Leu-Leu-Glu-Glu-Lys-Leu-Lys-Glu-Ala-
Glu-Thr-Arg-Ala-Glu-Phe-Ala-Glu-Arg-Ser-Val-Ala-Lys-Leu-Glu

FIG. 1

Ser-Leu-Glu-Ala-Gln-Ala-Glu-Lys-Tyr-Ser-Gln-Lys-Glu-Asp-Lys-
Tyr-Glu-Glu-Glu-Ile-Lys-Ile-Leu-Thr-Asp-Lys-Leu-Lys-Glu-Ala-
Glu-Thr-Arg-Ala-Glu-Phe-Ala-Glu-Arg-Ser-Val-Thr-Lys-Leu-Glu

FIG. 2

TASTE ENHANCER

BACKGROUND OF THE INVENTION

1. Field of the Invention

This invention relates to a "KOKUMI" imparting material and "KOKUMI" imparting seasoning having "mouthfulness" and "good body" imparting functions. Such materials are produced by heating a mixture selected from the group consisting of (1) gelatin and tropomyosin and/or tropomyosin peptides, (2) gelatin and paramyosin, and (3) troponin and tropomyosin and/or tropomyosin peptides, and a low-molecular weight fraction of natural extracts, in water. In addition, the material obtained using mixture (3) also produces a "steady and sharp" (or "consolidation") phenomenon.

2. Description of the Prior Art

Natural extracts such as meat extract, chicken extract, fishery product extract, and vegetable extract have been widely used for commercial purposes as bases for various dishes. These natural extracts function, for example, to tighten the whole taste of the food, that is, to impart complex and spread taste, to impart "steady and sharp" (or "consolidation") and "mouthfulness" and "good body", and to make up for deficiencies in richness of taste.

However, such natural extracts are expensive and are not readily available. Generally, processed natural extracts partially using such natural extracts (e.g., processed beef extract, commercially available consomme, commercially available bouillon, etc.) and natural extract substitutes (e.g., protein hydrolyzate) have been produced, marketed and utilized. In addition, basic stock material such as "KATSUOBUSHI" (dried bonito), "NIBOSHI" (dried sardines), "DASHI-KONBU" (laminaria used for a stock), "SHIITAKE" (*Cortinellus shiitake*: mushroom), and flavor enhancing seasonings prepared by mixing salt, sugar, "Umami taste" imparting seasonings, amino acids, etc. with these natural materials have also been widely utilized. These seasonings such as processed natural extracts, natural extract substitutes, and flavor enhancing seasonings, however, contain low molecular weight materials such as amino acids mainly including sodium glutamate, nucleic acids, organic acids, etc. Accordingly, food flavored with these seasonings disadvantageously have a simple, dim and flat taste, compared with those flavored with natural extracts or basic stock.

To overcome such defects, HVP (hydrolyzate of vegetable protein), HAP (hydrolyzate of animal protein), yeast extracts etc. have been added and used to impart "KOKUMI" (richness of taste or good body) and complex taste to the above seasonings for improvement of taste. Since HVP and HAP have a specific odor resulting from hydrolysis of vegetable or animal protein, and yeast extracts have a characteristic flavor, their usage as seasoning for food or drink is limited, and their taste and flavor are insufficient and obviously different from those of natural extracts or basic stock, which are models for such seasonings. Particularly, such seasonings are disadvantageously deficient in taste properties such as "steady and sharp" (or "consolidation") to tighten the taste and make it well-balanced, and "mouthfulness" and "good body" to impart development and depth of taste.

SUMMARY OF THE INVENTION

The object of the present invention is to provide novel seasoning materials and "KOKUMI" imparting seasonings to impart "steady and sharp" (or "consolidation") and "mouthfulness" and "good body", which natural materials such as beef bouillon and "KATSUOBUSHI" stock have, to food or drink. The present invention further provides a method to impart "steady and sharp" (or "consolidation") and "mouthfulness" and "good body" to food or drink.

After intensive study of the above problems, it has been discovered that novel macromolecular materials having "mouthfulness" and "good body" which are characteristic of natural materials, and having "mouthfulness" and "good body" imparting functions, are produced by heating a mixture selected from the group consisting of (1) gelatin and tropomyosin and/or tropomyosin peptides, (2) gelatin and paramyosin, and (3) troponin and tropomyosin and/or tropomyosin peptides, in various extract seasonings. Heating results in a reaction of the mixture with a low-molecular weight fraction of natural extracts. In addition, the material obtained using mixture (3) also produces a "steady and sharp" (or "consolidation") phenomenon.

The terms "steady and sharp" (or "consolidation") and "mouthfulness" and "good body" used herein mean taste quality of natural materials such as beef bouillon and "KATSUOBUSHI" stock which express tightening of the whole taste and continuity and depth of aftertaste. Such taste quality cannot be reproduced using the above-mentioned seasoning materials, for example, amino acids such as sodium glutamate, nucleic acid derivatives such as sodium inosinate and sodium guanylate, and HVP, HAP and yeast extract.

BRIEF DESCRIPTION OF THE DRAWINGS

FIG. 1 is the #206-250 amino acid peptide sequence (SEQ ID NO:1) of bovine alpha-tropomyosin.

FIG. 2 is the #206-250 amino acid peptide sequence (SEQ ID NO:2) of bovine beta-tropomyosin.

DETAILED DESCRIPTION OF THE INVENTION

In a first embodiment, the present invention relates to a novel "KOKUMI" imparting material containing a mixture selected from the group consisting of (1) gelatin and tropomyosin and/or tropomyosin peptides, (2) gelatin and paramyosin, and (3) troponin and tropomyosin and/or tropomyosin peptides. Such "KOKUMI" imparting materials can be commercialized, per se.

Troponin and tropomyosin, as are generally known, are materials obtained, for example, by extraction from various animals and fungi. For the purpose of the present invention, those derived from any source may be used. Troponin and tropomyosin are well known proteins which control muscular contraction and relaxation depending on calcium ions. Further, as is generally known, each amounts to about 5% of the proteins in muscles of animals.

Paramyosin, as is generally known, is a material obtained, for example, by extraction from various animals. For the purpose of the present invention, those derived from any such source may be used. Paramyosin is a protein which appears in invertebrate animals such as shellfish and insects, and bonds to myosin in muscle. Further, as is generally known, paramyosin amounts to about 5 to 50% of the proteins in muscles of invertebrate animals.

As gelatin, acid-treated gelatin, alkali-treated gelatin, water-soluble gelatin and enzyme decomposed gelatin are known. Any of them may be used for the purposes of the present invention.

Tropomyosin peptides can be prepared by enzymic hydrolysis of tropomyosin. As for the enzymic hydrolysis, proteolytic enzyme including endo-proteinase such as trypsin, chymotrypsin and papain, etc., and exo-proteinase such as aminopeptidase and carboxypeptidase can be used for the preparation of tropomyosin peptides. For the purpose of the present invention, any proteolytic enzyme including the crude enzyme preparation may be used. The obtained hydrolysate may be directly used for the preparation of KOKUMI imparting material. The peptide fractions obtained by the separation using dialysis, ultra-filtration, and liquid chromatography from the above hydrolysate can be also used.

In a second embodiment, the present invention relates to a novel "KOKUMI" imparting seasoning containing a low-molecular weight fraction of natural extracts in combination with a mixture selected from the group consisting of (1) gelatin and tropomyosin and/or tropomyosin peptides, (2) gelatin and paramyosin, and (3) troponin and tropomyosin and/or tropomyosin peptides. Such seasonings can also be directly marketed, per se.

Gelatin, paramyosin, troponin and tropomyosin and/or tropomyosin peptides are as described above.

A low-molecular weight fraction of natural extracts means a low-molecular weight fraction which can provide macromolecular materials having "steady and sharp" (or "consolidation") and "mouthfulness" and "good body" imparting functions upon heating with a mixture selected from the group consisting of (1) gelatin and tropomyosin and/or tropomyosin peptides, (2) gelatin and paramyosin, and (3) troponin and tropomyosin and/or tropomyosin peptides, in water. For example, it means a fraction having a fractional molecular weight not more than 10,000 as determined using gel filtration column "TOYOPEARL HW55F" (manufactured by Tosoh Corp.). Such low-molecular weight fractions may be those prepared from natural extracts, or they can be used in the form of unprepared meat extract such as beef extract, pork extract or chicken extract; fishery product extract such as bonito extract, mackerel extract, scallop extract, short-necked clam extract; and yeast extract. Moreover, they may be used in the form of "mixed" extract containing natural extracts, or as natural extract substitutes such as amino acid mixtures or a mixture of natural extracts and natural extract substitutes.

In a third embodiment, the present invention relates to a novel "KOKUMI" imparting seasoning prepared by heating a mixture selected from the group consisting of (1) gelatin and tropomyosin and/or tropomyosin peptides, (2) gelatin and paramyosin, and (3) troponin and tropomyosin and/or tropomyosin peptides, and a low-molecular weight fraction of natural extracts and/or substitutes thereof, in water.

Such "KOKUMI" imparting seasonings, that is, "KOKUMI" imparting seasonings having the function of imparting "steady and sharp" (or "consolidation") and "mouthfulness" and "good body" characteristics of natural materials such as beef bouillon and "KATSUOBUSHI" stock, can be produced by the process described below. A mixture selected from the group consisting of (1) gelatin and tropomyosin and/or tropomyosin peptides, (2) gelatin and paramyosin, and (3) troponin and tropomyosin and/or tropomyosin peptides, is dissolved in a seasoning solution such as "KATSUOBUSHI" extract or beef extract, and heated under conditions suitable for production of macromolecular materials having "steady and sharp" (or "consolidation") and "mouthfulness" and "good body" imparting functions. Such conditions include, for example, heating at 50°–150° C. for 1–5 hours. In this case, the concentration of each component of the above-defined mixture is, for example, 0.01–10% (additional). The reaction is carried out while the solid concentration of extract seasoning solution is adjusted, for example, to 5–80% during heating, but it is not particularly limited to the above concentration. Gelatin is collagen which is irreversibly changed to be water-soluble by boiling collagen with water. Accordingly, gelatin used for production of the "KOKUMI" imparting seasoning of the present invention may be in the form of collagen. Alternatively, it may be in the form of binding tissue, tendon, cartilage of animal having collagen, or extract thereof.

The reaction solution after heating may be used directly or after recovery of the macromolecular fraction, i.e., the fraction mainly containing protein, optionally using dialysis, ultrafiltration, ethanol precipitation, etc. to produce "KOKUMI" imparting seasoning of the present invention.

The thus obtained seasonings impart "steady and sharp" (or "consolidation") and "mouthfulness" and "good body", and enhance the taste quality, when added to stock for Japanese dishes, for example, basic stock of "KATSUOBUSHI" (dried bonito), chicken, fishery product, "KONBU" (laminaria), beef, "SHIITAKE" (*Cortinellus shiitake*: mushroom), etc., or to soup stock for Western dishes, for example, basic stock of beef, chicken, pork, fishery product, etc., or to Tan (Chinese stock) for Chinese dishes, for example, basic stock of beef, chicken, pork, ham, eyes of scallops ear shells, lobsters, "SURUME" (dried cuttlefish), "SHIITAKE", Chinese cabbage, celery, etc.

In a fourth embodiment, the present invention relates to processed natural extracts, natural extract substitutes, basic stock materials or flavor enhancing seasonings which contain the "KOKUMI" imparting seasoning prepared by heating a mixture selected from the group consisting of (1) gelatin and tropomyosin and/or tropomyosin peptides, (2) gelatin and paramyosin, and (3) troponin and tropomyosin and/or tropomyosin peptides, and a low-molecular weight fraction of natural extracts, in water. As described above, the above processed natural extracts and natural extract substitutes are added particularly to HVP, HAP, or yeast extract, which are available at relatively low cost, or added to low-quality and inexpensive beef extract, or added to or used with basic stock material or conventional flavor enhancing seasoning, to tighten the taste, to impart and enhance "steady and sharp" (or "consolidation") and "mouthfulness" and "good body" and otherwise improve the taste.

The concentration of the "steady and sharp" (or "consolidation") and "mouthfulness" and "good body" imparting material may vary depending on the food or drink, or seasoning to which said material is to be added. Those skilled in the art can readily determine suitable amounts by simple trials. In a preferred embodiment, the material is added so that the concentration in solution is 0.005 to 20% (in terms of solid content) to impart "steady and sharp" (or "consolidation") and "mouthfulness" and "good body", and to provide a well-balanced taste, free of dimness and flatness.

In a fifth embodiment, the present invention relates to food or drink having "steady and sharp" (or "consolidation") and "mouthfulness" and "good body", which is produced by heating the food or drink while adding at least one of the members of a below-defined mixture to the food or drink already containing at least the members of the mixture not added, to impart or enhance "steady and sharp" (or "consolidation") and "mouthfulness" and "good body". The mixture is selected from the group consisting of (1) gelatin, tropomyosin and/or tropomyosin peptides, and a low-molecular weight fraction of natural extract, (2) gelatin, paramyosin, and a low-molecular weight fraction of natural extract, and (3) troponin, tropomyosin and/or tropomyosin peptides, and a low-molecular weight fraction of natural extract.

By way of example and not by way of limitation, the invention disclosed as the fifth embodiment would be carried out by heating a food or drink already containing gelatin and a low molecular weight fraction of natural extract while adding tropomyosin thereto.

It is understood that such food or drink having "steady and sharp" (or "consolidation") and "mouthfulness" and "good body" includes the seasoning material itself according to the above description.

The process for producing such food having "steady and sharp" (or "consolidation") and "mouthfulness" and "good body" can be carried out according to the conventional process for producing food or drink without any particular limitation, except that food or drink or raw material thereof is heated while adding at least one of the members of a below-defined mixture to the food or drink already containing at least the members of the mixture not added, under conditions to produce material having "steady and sharp" (or "consolidation") and "mouthfulness" and "good body" imparting functions. The mixture is selected from the group consisting of (1) gelatin, tropomyosin and/or tropomyosin peptides, and a low-molecular weight fraction of natural extract, (2) gelatin, paramyosin, and a low-molecular weight fraction of natural extract, and (3) troponin, tropomyosin and/or tropomyosin peptides, and a low-molecular weight fraction of natural extract.

Such process can impart "steady and sharp" (or "consolidation") and "mouthfulness" and "good body" to the existing food or drink, or enhance "steady and sharp" (or "consolidation") and "mouthfulness" and "good body" already imparted to the food or drink. When food is produced from raw materials by heating, if possible, the above-mentioned "steady and sharp" (or "consolidation") and "mouthfulness" and "good body" imparting materials may be simultaneously produced during this heating step.

The "steady and sharp" (or "consolidation") and "mouthfulness" and "good body" imparting materials according to the present invention can be prepared by heating a mixture selected from the group consisting of (1) gelatin and tropomyosin and/or tropomyosin peptides, (2) gelatin and paramyosin, and (3) troponin and tropomyosin and/or tropomyosin peptides, and a low-molecular weight fraction of natural extracts, in water. Accordingly, in the process for producing "steady and sharp" (or "consolidation") and "mouthfulness" and "good body" imparting materials of the present invention, the food or drink or raw material thereof should contain sufficient water to produce "steady and sharp" (or "consolidation") and "mouthfulness" and "good body" imparting material.

The above materials are not required to be added in freshly prepared form. If they are present in existing food or drink or raw materials thereof, they can be utilized as they are. However, at least one of the materials should be added in freshly prepared form.

The process for producing materials to impart "steady and sharp" (or "consolidation") and "mouthfulness" and "good body" characteristics of the natural materials and the advantages of these materials will be explained in the following examples. The examples are not intended to limit the scope of the present invention.

A. Gelatin-Tropomyosin Mixture

EXAMPLE 1

Components with functional properties for imparting some taste or taste modification to commercially available natural extracts, which are known for high quality, were examined.

A commercially available natural beef extract of high quality was dialyzed (fractional molecular weight, 10,000) to fractionate the extract into high and low molecular weight fractions.

The components of the low molecular weight fraction included taste-imparting amino acids containing sodium glutamate, organic acids, nucleic acid derivatives, sugars, minerals, etc. according to the analysis. The following experimental results showed that there were functional components which could not be identified. On the other hand, the macromolecular weight fraction mainly contained protein and melanoidins (products of non-enzymatic browning).

Various macromolecular weight materials shown in the following Table 1B, which are the precursor proteins for the above low molecular weight and macromolecular weight fractions, were obtained by heat treatment shown in the following Table 1A.

TABLE 1A

| Heat treatment process |
|---|
| (1) Sample: <br> (a) low molecular weight fraction of extract <br> (b) precursor protein candidate <br> (a), (b) and water were added to prepare a mixture with solid content of 30%. |
| (2) The mixture was heated at 95° C. for 3 hours. |
| (3) The low molecular weight fraction (fractional molecular weight ≦10,000) was removed by dialysis of the mixture after heating. |
| (4) The high molecular weight fraction was lyophilized to obtain the macromolecular weight sample. |

The thus obtained treated macromolecular material was added to a solution of beef stew at a concentration of 50 mg %, and the results were evaluated by an organoleptic test using a 5-member panel. The results are shown in the following Table 1B.

TABLE 1B

| Heat-treated Sample | "mouthfulness" and "good body" | Profile |
|---|---|---|
| (1) Low molecular weight fraction + Macromolecular weight fraction | +++ | Aftertase enhanced and continued (Control) |
| (2) Synthetic extract + Macromolecular weight fraction | − | Initial taste restrained |
| (3) Low molecular weight fraction + Gelatin | − | Initial taste masked |
| (4) Low molecular weight fraction + Tropomyosin | − | Light and sour aftertaste |
| (5) Low molecular weight fraction + Gelatin + Tropomyosin (The present invention) | ++ | Depth and spread of taste |
| (6) Gelatin + Tropomyosin | − | Aftertaste slightly enhanced |

In Table 1B, the synthetic extract of sample (2) has a composition similar to those of low molecular weight fractions of beef extract, consisting of taste-imparting amino acids containing sodium glutamate, organic acids, nucleic acid derivatives, sugars and minerals. When this sample was heated with a high molecular weight fraction of beef extract, however, the taste profile obtained by the heating of sample (1) was not obtained. This result suggests that the low molecular weight fraction contains unidentified taste-imparting functional components which are not contained in synthetic extract.

Further, all of samples (1) to (6) did not have "mouthfulness" or "good body" before heating.

Accordingly, it is understood that "mouthfulness" and "good body" imparting materials are obtained by simultaneously heating a low molecular weight fraction of natural extract, gelatin and tropomyosin. After the heat treatment process in Table 1A, the low molecular weight fraction was removed to produce sample (5), "mouthfulness" and "good body" imparting materials are provided. This result suggests that a part of the low molecular weight fraction bonds or reacts with gelatin and tropomyosin.

EXAMPLE 2

Tropomyosin (50 mg), prepared from beef according to the method of Nishida et al. (Journal of Biological Chemistry, 261, 16749 (1986)), and pig skin gelatin (acid-treated gelatin) (50 mg) were dissolved in a commercially available beef extract seasoning solution (100 ml) and heated in an autoclave at 90° C. for 6 hours. The solid content of the extract seasoning solution (dry basis) was previously adjusted to 15%. The solution after heating was dialyzed to obtain 121 mg of macromolecular weight fraction (fractional molecular weight, 10,000), i.e., a fraction mainly containing protein. This procedure was repeated five times to provide the fractions (0.6 g, in total).

The thus obtained material was added to a commercially available consomme soup as follows. To commercially available dried consomme granules (manufactured by Ajinomoto Co., Inc.) (20 g) and the seasoning powder of the present invention (0.5 g), water (hot water) was added to bring the total volume to 1 liter.

As a control, consomme soup without the seasoning of the present invention was prepared. For each soup, an organoleptic test was performed by a 20-member panel. The results are shown in the following Table 2.

TABLE 2

|  | Soup according to the present invention | Control soup |
| --- | --- | --- |
| Favorable aroma | 12 | 8 |
| Favorable flavor | 13 | 7 |
| Enhanced "mouthfulness" and "good body" | 17* | 3 |
| Enhanced aftertaste | 17* | 3 |
| Enhanced complex taste and flavor | 18* | 2 |
| Generally favorable | 17* | 3 |

*: Significantly different at a risk factor of 5%.

EXAMPLE 3

Tropomyosin (50 mg) prepared from beef, and pig skin gelatin (acid-treated gelatin) (50 mg) were dissolved in a commercially available KATSUO extract seasoning solution (50 ml) and heated under pressure (at 121° C.) for 6 hours. The solid content of the extract seasoning solution (dry basis) was previously adjusted to 45%. The solution after heating was dialyzed to obtain 115 mg of macromolecular weight fraction, i.e., fraction mainly containing protein. This procedure was repeated six times to provide the fractions (0.7 g, in total).

The thus obtained material was added to a commercially available consomme soup, as follows. To commercially available dried consomme granules (manufactured by Ajinomoto Co., Inc.) (20 g) and the seasoning powder of the present invention (0.5 g), water (hot water) was added to bring the total volume to 1 liter.

As a control, consomme soup without the seasoning of the present invention was prepared. For each soup, an organoleptic test was conducted in the same manner as in Example 2. The results are shown in the following Table 3.

TABLE 3

|  | Soup according to the present invention | Control soup |
| --- | --- | --- |
| Favorable aroma | 12 | 8 |
| Favorable flavor | 13 | 7 |
| Enhanced "mouthfulness" and "good body" | 18* | 2 |
| Enhanced aftertaste | 17* | 3 |
| Enhanced complex taste and flavor | 18* | 2 |
| Generally favorable | 17* | 3 |

*: Significantly different at a risk factor of 5%.

EXAMPLE 4

Tropomyosin (50 mg) prepared from beef, and calf bone gelatin (alkali-treated gelatin) (50 mg) were dissolved in a commercially available beef extract seasoning solution (50 ml) and heated at 85° C. for 6 hours. The solid content of the extract seasoning solution (dry basis) was previously adjusted to 45%. The reaction solution after heating was dialyzed by ultrafiltration to obtain 120 mg of macromolecular weight fraction (fractional molecular weight of 8,000), i.e., fraction mainly containing protein.

The thus obtained material was added to a commercially available curry roux, as follows. To a curry powder (1.5 g), lard (8.0 g), flour (6.0 g), salt (1.7 g) and seasoning powder of the present invention (0.1 g), water (hot water) was added to bring the total volume to 100 mL, then heated and stirred.

As a control, curry roux without the seasoning of the present invention was prepared. For each curry roux, an organoleptic test was conducted in the same manner as in Example 2. The results are shown in the following Table 4.

TABLE 4

|  | Curry roux according to the present invention | Control curry roux |
| --- | --- | --- |
| Favorable aroma | 13 | 7 |
| Favorable flavor | 13 | 7 |
| Enhanced "mouthfulness" and "good body" | 18* | 2 |
| Enhanced aftertaste | 18* | 2 |
| Enhanced complex taste and flavor | 18* | 2 |
| Generally favorable | 18* | 2 |

*: Significantly different at a risk factor of 5%.

EXAMPLE 5

Tropomyosin (0.5 g) was added to a commercially available consomme soup (1 L), and heated at 95° C. for 3 hours according to the present invention. For comparison, a control soup was obtained by the same procedure except that tropomyosin was not added.

The results of an organoleptic test of each soup conducted in the same manner as in Example 2 are shown in Table 5.

TABLE 5

|  | Soup according to the present invention | Control Soup |
| --- | --- | --- |
| Favorable aroma | 14 | 6 |
| Favorable flavor | 15 | 5 |
| Enhanced "mouthfulness" and "good body" | 18* | 2 |
| Enhanced aftertaste | 18* | 2 |
| Enhanced complex taste and flavor | 18* | 2 |
| Generally favorable | 18* | 2 |

*: Significantly different at a risk factor of 5%.

EXAMPLE 6

Tropomyosin (0.5 g) and pig skin gelatin (acid-treated gelatin) (0.5 g) were added to a commercially available vegetable soup (1 L), and heated at 95° C. for 3 hours, according to the present invention. For comparison, the commercially available vegetable soup was directly heated at 95° C. for 3 hours to obtain a control soup.

The results of an organoleptic test of each soup conducted in the same manner as in Example 2 are shown in Table 6.

TABLE 6

|  | Soup according to the present invention | Control Soup |
| --- | --- | --- |
| Favorable aroma | 13 | 7 |
| Favorable flavor | 14 | 6 |
| Enhanced "mouthfulness" and "good body" | 18* | 2 |
| Enhanced aftertaste | 18* | 2 |
| Enhanced complex taste and flavor | 18* | 2 |
| Generally favorable | 18* | 2 |

*: Significantly different at a risk factor of 5%.

B. Gelatin-Paramyosin Mixture

EXAMPLE 7

Paramyosin (50 mg), prepared from scallops according to the method of Johnson et al. (Science, 130, 160 (1959)), and pig skin gelatin (acid-treated gelatin) (50 mg) were dissolved in a commercially available beef extract seasoning solution (100 ml) and heated in an autoclave at 90° C. for 6 hours. The solid content of the extract seasoning solution (dry basis) was previously adjusted to 15%. The reaction solution after heating was dialyzed to obtain 95 mg of macromolecular weight fraction (fractional molecular weight, 10,000), that is, a fraction mainly containing protein. This procedure was repeated five times to obtain about 0.5 mg of the fraction.

The thus obtained materials were added to a commercially available consomme soup, as follows. Water (hot water) was added to commercially available dried consomme granules (Ajinomoto Co., Inc.) (20 g) and the seasoning powder of the present invention (0.5 g) to bring the total volume to 1 liter.

As a control, consomme soup without the seasoning of the present invention was prepared. An organoleptic test was conducted for each soup by a 20-member panel. The results are shown in Table 7.

TABLE 7

|  | Soup according to the present invention | Control Soup |
| --- | --- | --- |
| Favorable aroma | 13 | 7 |
| Favorable flavor | 12 | 8 |
| Enhanced "KOKUMI" | 17* | 3 |
| Enhanced aftertaste | 17* | 3 |
| Enhanced complex taste and flavor | 18* | 2 |
| Generally favorable | 17* | 3 |

*: Significantly different at a risk factor of 5%.

EXAMPLE 8

Paramyosin (50 mg), prepared from scallops, and pig skin gelatin (acid-treated gelatin) (50 mg) were dissolved in a commercially available "KATSUO" extract seasoning solution (50 ml), and heated under pressure (121° C.) for 6 hours. The solid content of the extract seasoning solution (dry basis) of the extract seasoning solution was previously adjusted to 45%. The reaction solution after heating was dialyzed to obtain 108 mg of macromolecular weight fraction, that is, a fraction mainly containing protein. This procedure was repeated six times to obtain about 0.6 g (in total) of the fraction.

The thus obtained materials were added to a commercially available consomme soup, as follows. Water (hot water) was added to commercially available dried consomme granules (Ajinomoto Co., Inc.) (20 g) and the seasoning powder of the present invention (0.5 g) to bring the total volume to 1 liter.

As a control, consomme soup without the seasoning of the present invention was prepared. An organoleptic test was conducted for each soup by a 20-member panel. The results are shown in Table 8.

TABLE 8

|  | Soup according to the present invention | Control Soup |
| --- | --- | --- |
| Favorable aroma | 13 | 7 |
| Favorable flavor | 14 | 6 |
| Enhanced "KOKUMI" | 18* | 2 |
| Enhanced aftertaste | 17* | 3 |
| Enhanced complex taste and flavor | 18* | 2 |
| Generally favorable | 17* | 3 |

*: Significantly different at a risk factor of 5%.

EXAMPLE 9

Paramyosin (50 mg), prepared from scallops, and calf bone gelatin (alkali-treated gelatin) (50 mg) were dissolved in a commercially available yeast extract seasoning solution (50 ml), and heated at 85° C. for 6 hours. The solid content of the extract seasoning solution (dry basis) was previously adjusted to 45%. The reaction solution after heating was dialyzed to obtain 125 mg of macromolecular fraction, that is, a fraction mainly containing protein.

The thus obtained materials were added to a commercially available curry roux, as follows. To curry powder (1.5 g), lard (8.0 g), flour (6.0 g), salt (1.7 g) and the above seasoning powder of the present invention (0.1 g), water (hot water) was added to bring the total volume to 100 mL, then heated and stirred.

As a control, curry roux without the seasoning of the present invention was prepared. An organoleptic test was conducted for each curry roux in the same manner as in Example 7. The results are shown in the following Table 9.

TABLE 9

|  | Curry roux according to the present invention | Control curry roux |
| --- | --- | --- |
| Favorable aroma | 12 | 8 |
| Favorable flavor | 13 | 7 |
| Enhanced "KOKUMI" | 18* | 2 |
| Enhanced aftertaste | 18* | 2 |
| Enhanced complex taste and flavor | 18* | 2 |
| Generally favorable | 18* | 2 |

*: Significantly different at a risk factor of 5%.

EXAMPLE 10

Paramyosin (0.5 g) was added to a commercially available consomme soup (1 L) and heated at 95° C. for 3 hours, according to the present invention. For comparison, a control soup was obtained by the same procedure except the paramyosin was not added.

The results of an organoleptic test of each soup conducted in the same manner as in Example 7 are shown in Table 10.

TABLE 10

|  | Soup according to the present invention | Control Soup |
| --- | --- | --- |
| Favorable aroma | 12 | 8 |
| Favorable flavor | 13 | 7 |
| Enhanced "KOKUMI" | 18* | 2 |
| Enhanced aftertaste | 18* | 2 |
| Enhanced complex taste and flavor | 18* | 2 |
| Generally favorable | 18* | 2 |

*: Significantly different at a risk factor of 5%.

EXAMPLE 11

Paramyosin (0.5 g) was added to a commercially available consomme soup (1 L), and heated at 95° C. for 3 hours, according to the present invention. For comparison, a control soup was obtained by the same procedure except that paramyosin was not added.

The results of an organoleptic test of each soup conducted in the same manner as in Example 7 are shown in Table 11.

TABLE 11

|  | Soup according to the present invention | Control Soup |
| --- | --- | --- |
| Favorable aroma | 12 | 8 |
| Favorable flavor | 13 | 7 |
| Enhanced "density" and "good body" | 18* | 2 |
| Enhanced aftertaste | 18* | 2 |

TABLE 11-continued

|  | Soup according to the present invention | Control Soup |
| --- | --- | --- |
| Enhanced complex taste and flavor | 18* | 2 |
| Generally favorable | 18* | 2 |

*: Significantly different at a risk factor of 5%.

C. Troponin-Tropomyosin Mixture

EXAMPLE 12

Troponin (250 mg), prepared from beef according to the method of Nishida et al. (Journal of Biological Chemistry, 261, 16749 (1986)) and tropomyosin (250 mg) were dissolved in a commercially available beef extract seasoning solution (500 ml) and heated in a pan at 95° C. for 3 hours. The solid content of the extract seasoning solution (dry basis) was previously adjusted to 15%. The reaction solution after heating was dialyzed to obtain about 0.4 g of macromolecular weight fraction (dry basis) mainly containing a dialyzate solution (fractional molecular weight $\geq 10,000$), that is, a fraction mainly containing protein.

The thus obtained materials were added to a commercially available consomme soup at concentrations of 0.01%, 0.05%, 0.1% and 0.2%, and a taste profile evaluation was performed by a 5-member panel. All of the samples containing the above materials were found to enhance "mouthfulness and good body" without changing the flavor of the commercially available consomme soup. Further, they were found to impart "steady and sharp" (or "consolidation") to tighten the whole taste. However, the addition of the material at concentrations above 0.05% did not substantially change the results. From an economical point of view, it is considered that about a 0.1% concentration is sufficient.

EXAMPLE 13

Troponin (250 mg), prepared in the same manner as Example 12, and tropomyosin (250 mg) were dissolved in a commercially available yeast extract seasoning solution (250 ml) and heated in a pan at 95° C. for 3 hours. The solid content of the extract seasoning solution was previously adjusted to 30%. The reaction solution after heating was dialyzed and turbid material (salting-in protein aggregate upon decrease of ion strength) produced in a dialyzate solution was collected using a centrifugal separator (about 10,000 xg, 20 minutes) to obtain about 0.1 g (dry basis).

The thus obtained materials were added to a commercially available consomme soup and a taste profile evaluation was performed by a 5-member panel. All samples containing the above materials were found to enhance "mouthfulness and good body" and further impart "steady and sharp" (or "consolidation") to tighten the whole taste without changing the flavor of the control, i.e., the commercially available consomme soup.

EXAMPLE 14

Troponin (ca 0.3 g) prepared in the same manner as Example 12 and tropomyosin (ca 0.3 g) were added to a commercially available beef curry soup (0.5 L), and heated at 95° C. for 4 hours. For comparison, a control soup was obtained in the same manner except that troponin and tropomyosin were not added.

The results of as organoleptic test of each soup are shown in the following Table 12.

TABLE 12

|  | Soup according to the present invention | Control Soup |
| --- | --- | --- |
| Favorable aroma | 11 | 9 |
| Favorable flavor | 12 | 8 |
| Enhanced "mouthfulness" and "good body" | 17* | 3 |
| Enhanced "consolidation" | 16* | 4 |
| Generally favorable | 16* | 4 |

*: Significantly different at a risk factor of 5%.

D. Gelatin-Tropomyosin Peptides Mixture

EXAMPLE 15

Tropomyosin (50g), prepared from chicken was digested by chymotrypsin (25 mg) at 37° C. for 1 hour. The above tropomyosin hydrolysate (1 g), and pig skin gelatin (acid-treated gelatin) (1g) were dissolved in a commercial available beef extract seasoning solution (100 ml) and heated at 95° C. for 6 hours. The solid content of the extract seasoning solution (dry basis) was previously adjusted to 15%. The solution after heating was dialyzed to obtain 1.8 g of macromolecular weight fraction, i.e., fraction mainly containing protein.

The thus obtained material was added to a commercially available consomme soup, as follows. To commercially available dried consomme granules (manufactured by Ajinomoto Co., Inc.) (20 g) and the seasoning powder of the present invention (0.5 g), water (hot water) was added to bring the total volume to 1 liter.

As a control, consomme soup without the seasoning of the present invention was prepared. For each soup, an organoleptic test was conducted in the same manner as in Example 2. The results are shown in the following Table 13.

TABLE 13

|  | Soup according to the present invention | Control Soup |
| --- | --- | --- |
| Favorable aroma | 13 | 7 |
| Favorable flavor | 14 | 6 |
| Enhanced "KOKUMI" | 18* | 2 |
| Enhanced Aftertaste | 18* | 2 |
| Enhanced complex taste and flavor | 17* | 3 |
| Generally favorable | 18* | 2 |

*: Significantly different at a risk factor of 5%.

EXAMPLE 16

Tropomyosin (50g), prepared from beef was digested by trypsin (25 mg) at 37° C. for 1 hour. From the obtained hydrolysate, a peptide consistent with the #206-250 sequence of bovine alpha-tropomyosin was prepared using ultra-filtration and high performance liquid chromatography. The amino acid sequence of the obtained peptide is shown in FIG. 1. The yield of this peptide fragment was 250 mg.

The above obtained peptide (100 mg), and pig skin gelatin (acid-treated gelatin) (100mg) were dissolved in a commercial available beef extract seasoning solution (100 ml) and heated at 95° C. for 6 hours. The solid content of the extract seasoning solution (dry basis) was previously adjusted to 30%. The solution after heating was dialyzed to obtain 195 mg of macromolecular weight fraction, i.e., fraction mainly containing protein.

The thus obtained material was added to a commercially available consomme soup, as follows. To commercially available dried consomme granules (manufactured by Ajinomoto Co., Inc.) (6 g) and the seasoning powder of the present invention (150 mg), water (hot water) was added to bring the total volume to 300 ml.

As a control, consomme soup without the seasoning of the present invention was prepared. For each soup, an organoleptic test was conducted in the same manner as in Example 2. The results are shown in the following Table 14.

TABLE 14

|  | Soup according to the present invention | Control Soup |
| --- | --- | --- |
| Favorable aroma | 12 | 8 |
| Favorable flavor | 14 | 6 |
| Enhanced "KOKUMI" | 18* | 2 |
| Enhanced Aftertaste | 18* | 2 |
| Enhanced complex taste and flavor | 18* | 2 |
| Generally favorable | 18* | 2 |

*: Significantly different at a risk factor of 5%.

EXAMPLE 17

Tropomyosin (50 g) prepared from beef was digested by trypsin (25 mg) at 37° C. for 1 hour. From the obtained hydrolysate, a peptide consistent with the #206-250 sequence of bovine beta-tropomyosin was prepared using ultra-filtration and high performance liquid chromatography. The amino acid sequence of the obtained peptide is shown in FIG. 2. The yield of this peptide fragment was 228 mg.

The above obtained peptide (100 mg), and pig skin gelatin (acid-treated gelatin) (100 mg) were dissolved in a commercial available beef extract seasoning solution (100 ml) and heated at 95° C. for 6 hours. The solid content of the extract seasoning solution (dry basis) was previously adjusted to 30%. The solution after heating was dialyzed to obtain 195 mg of macromolecular weight fraction, i.e., fraction mainly containing protein.

The thus obtained material was added to a commercially available consomme soup, as follows. To commercially available dried consomme granules (manufactured by Ajinomoto Co., Inc.) (6 g) and the seasoning powder of the present invention (150 mg), water (hot water) was added to bring the total volume to 300 ml.

As a control, consomme soup without the seasoning of the present invention was prepared. For each soup, an organoleptic test was conducted in the same manner as in Example 2. The results are shown in the following Table 15.

TABLE 15

|  | Soup according to the present invention | Control Soup |
| --- | --- | --- |
| Favorable aroma | 13 | 7 |
| Favorable flavor | 15 | 5 |
| Enhanced "KOKUMI" | 17* | 3 |
| Enhanced Aftertaste | 18* | 2 |
| Enhanced complex taste and flavor | 18* | 2 |
| Generally favorable | 18* | 2 |

*: Significantly different at a risk factor of 5%.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A taste quality enhancing seasoning which is prepared by heating a mixture, comprising (1) gelatin and tropomyosin or tropomyosin peptides or both, (2) gelatin and paramyosin, and (3) troponin or tropomyosin peptides or both, and a fraction of natural extracts having a molecular weight of not more than about 10,000 as determined by gel filtration, in water.

2. The taste quality enhancing material of claim 1, which is gelatin and tropomyosin or tropomyosin peptides or both.

3. The taste quality enhancing material of claim 1, which is gelatin and paramyosin.

4. The taste quality enhancing material of claim 1, which is troponin and tropomyosin or tropomyosin peptides or both.

5. The taste quality enhancing material of claim 2, wherein said gelatin is in the form of collagen, binding tissue, tendon, cartilage of an animal having collagen or extract thereof.

6. The taste quality enhancing material of claim 3, wherein said gelatin is in the form of collagen, binding tissue, tendon, cartilage of an animal having collagen or extracts thereof.

7. The taste quality enhancing material of claim 4, wherein said gelatin is in the form of collagen, binding tissue, tendon, cartilage of an animal having collagen or extracts thereof.

8. The taste quality enhancing seasoning of claim 1, wherein the mixture is gelatin and tropomyosin or tropomyosin peptides or both.

9. The taste quality enhancing seasoning of claim 1, wherein the mixture is gelatin and paramyosin.

10. The taste quality enhancing seasoning of claim 1, wherein the mixture is troponin and tropomyosin or tropomyosin peptides or both.

11. The taste quality enhancing material of claim 8, wherein said gelatin is in the form of collagen, binding tissue, tendon, cartilage of an animal having collagen or extracts thereof.

12. The taste quality enhancing material of claim 9, wherein said gelatin is in the form of collagen, binding tissue, tendon, cartilage of an animal having collagen or extracts thereof.

13. The taste quality enhancing material of claim 10, wherein said gelatin is in the form of collagen, binding tissue, tendon, cartilage of an animal having collagen or extracts thereof.

14. Processed natural extracts, natural extract substitutes, basic stock materials or flavor enhancing seasonings, which comprise the taste quality enhancing seasoning of claim 8.

15. The processed natural extracts, natural extract substitutes, basic stock materials or flavor enhancing seasonings of claim 14, wherein said taste quality enhancing seasoning is present in an amount such that a solid content of about 0.005 to 20% is obtained in solution.

16. Processed natural extracts, natural extract substitutes, basic stock materials or flavor enhancing seasonings, which comprise the taste quality enhancing seasoning of claim 9.

17. The processed natural extracts, natural extract substitutes, basic stock materials or flavor enhancing seasonings of claim 16, wherein said taste quality enhancing seasoning is present in an amount such that a solid content of about 0.005 to 20% is obtained in solution.

18. Processed natural extracts, natural extract substitutes, basic stock materials or flavor enhancing seasonings, which comprise the taste quality enhancing seasoning of claim 10.

19. The processed natural extracts, natural extract substitutes, basic stock materials or flavor enhancing seasonings of claim 18, wherein said taste quality enhancing seasoning is present in an amount such that a solid content of about 0.005 to 20% is obtained in solution.

20. A food or drink having imparted or enhanced taste quality comprising gelatin, tropomyosin or tropomyosin peptides or both and a low molecular weight fraction of natural extracts having a molecular weight of not more than about 10,000 as determined by gel filtration or a synthetic substitute therefor, comprising taste-imparting amino acids, which is produced by heating the food or drink or raw materials thereof while adding at least one of gelatin, tropomyosin, or tropomyosin peptides or both and a low molecular weight fraction of natural extracts having a molecular weight of not more than about 10,000 as determined by gel filtration or said synthetic substitute therefor, to the food, drink or raw materials thereof already comprising at least the members not added, to impart or enhance said taste quality.

21. A food or drink having imparted or enhanced taste quality comprising gelatin, paramyosin and a low molecular weight fraction of natural extracts having a molecular weight of not more than about 10,000 as determined by gel filtration or a synthetic substitute therefor, comprising taste-imparting amino acids, which is produced by heating the food or drink or raw materials thereof while adding at least one of gelatin, paramyosin and a low molecular weight fraction of natural extracts having a molecular weight of not more than about 10,000 as determined by gel filtration or said synthetic substitute therefor, to the food, drink or raw materials thereof already containing at least the members not added, to impart or enhance said taste quality.

22. A food or drink having imparted or enhanced taste quality comprising troponin, tropomyosin or tropomyosin peptides or both, and a low molecular weight fraction of natural extracts having a molecular weight of not more than about 10,000 as determined by gel filtration or a synthetic substitute therefor, comprising taste-imparting amino acids, which is produced by heating the food or drink or raw materials thereof while adding at least one of troponin, tropomyosin or tropomyosin peptides or both, and a low-molecular weight fraction of natural extracts having a molecular weight of not more than about 10,000 as determined by gel filtration or said synthetic substitute therefor, to the food, drink or raw materials thereof already containing at least the members not added, to impart or enhance said taste quality.

23. A taste quality enhancing material, comprising a mixture of (1) gelatin and tropomyosin or tropomyosin peptides or both, (2) gelatin and paramyosin or (3) troponin and tropomyosin or tropomyosin peptides or both and wherein each of the mixtures (1), (2) and (3) further comprises a fraction of natural extracts having a molecular weight of not more than about 10,000 as determined by gel filtration.

* * * * *

UNITED STATES PATENT AND TRADEMARK OFFICE
CERTIFICATE OF CORRECTION

PATENT NO. : 5,679,397
DATED : October 21, 1997
INVENTOR(S) : Motonaka KURODA et al.

It is certified that error appears in the above-identified patent and that said Letters Patent is hereby corrected as shown below:

On the title page, Item [73], the Assignee should read:

-- Ajinomoto Co., Inc., Tokyo, Japan --

Signed and Sealed this

Sixth Day of January, 1998

Attest:

BRUCE LEHMAN

Attesting Officer

Commissioner of Patents and Trademarks

SEQUENCE LISTING ( 1 ) GENERAL INFORMATION:

( i i i ) NUMBER OF SEQUENCES: 2

( 2 ) INFORMATION FOR SEQ ID NO:1:

( i ) SEQUENCE CHARACTERISTICS:
      ( A ) LENGTH: 45 amino acids
      ( B ) TYPE: amino acid
      ( C ) STRANDEDNESS: single
      ( D ) TOPOLOGY: linear ( i i ) MOLECULE TYPE: peptide ( x i ) SEQUENCE DESCRIPTION: SEQ ID NO:1:

```
Ser  Leu  Glu  Ala  Gln  Ala  Asp  Lys  Tyr  Ser  Thr  Lys  Glu  Asp  Lys  Tyr
1                  5                            10                       15

Glu  Glu  Glu  Ile  Lys  Leu  Leu  Glu  Glu  Lys  Leu  Lys  Glu  Ala  Glu  Thr
               20                           25                   30

Arg  Ala  Glu  Phe  Ala  Glu  Arg  Ser  Val  Ala  Lys  Leu  Glu
          35                      40                      45
```

( 2 ) INFORMATION FOR SEQ ID NO:2:

( i ) SEQUENCE CHARACTERISTICS:
      ( A ) LENGTH: 45 amino acids
      ( B ) TYPE: amino acid
      ( C ) STRANDEDNESS: single
      ( D ) TOPOLOGY: linear ( i i ) MOLECULE TYPE: peptide ( x i ) SEQUENCE DESCRIPTION: SEQ ID NO:2:

```
Ser  Leu  Glu  Ala  Gln  Ala  Glu  Lys  Tyr  Ser  Gln  Lys  Glu  Asp  Lys  Tyr
1                  5                            10                       15

Glu  Glu  Glu  Ile  Lys  Ile  Leu  Thr  Asp  Lys  Leu  Lys  Glu  Ala  Glu  Thr
               20                           25                   30

Arg  Ala  Glu  Phe  Ala  Glu  Arg  Ser  Val  Thr  Lys  Leu  Glu
          35                      40                      45
```